United States Patent
Karlson et al.

(10) Patent No.: US 8,599,034 B2
(45) Date of Patent: Dec. 3, 2013

(54) SWITCH HAVING A FLAT DISPLAY

(75) Inventors: Björn Karlson, Nürnberg (DE); Lutz Pietschmann, Großschönau (DE)

(73) Assignee: Siemens Aktiengesellschaft, Munich (DE)

( * ) Notice: Subject to any disclaimer, the term of this patent is extended or adjusted under 35 U.S.C. 154(b) by 917 days.

(21) Appl. No.: 12/680,213

(22) PCT Filed: Sep. 1, 2008

(86) PCT No.: PCT/EP2008/061512
§ 371 (c)(1),
(2), (4) Date: Mar. 26, 2010

(87) PCT Pub. No.: WO2009/047051
PCT Pub. Date: Apr. 16, 2009

(65) Prior Publication Data
US 2010/0302053 A1    Dec. 2, 2010

(30) Foreign Application Priority Data
Oct. 1, 2007  (EP) ..................................... 07019291

(51) Int. Cl.
*G08B 5/00*    (2006.01)

(52) U.S. Cl.
USPC ................................. 340/815.4; 340/815.65

(58) Field of Classification Search
USPC .................................................... 340/815.4
See application file for complete search history.

(56) References Cited

U.S. PATENT DOCUMENTS

| | | | | |
|---|---|---|---|---|
| 4,792,783 A | * | 12/1988 | Burgess et al. | 307/10.1 |
| 5,134,505 A | | 7/1992 | Takei et al. | |
| 5,337,575 A | * | 8/1994 | Ishihara | 62/126 |
| 5,572,239 A | | 11/1996 | Jaeger | |
| 6,348,772 B1 | | 2/2002 | May | |
| 6,879,424 B2 | * | 4/2005 | Vincent et al. | 359/265 |
| 2003/0154970 A1 | * | 8/2003 | Huang | 126/39 R |
| 2005/0270619 A1 | | 12/2005 | Johnson et al. | |
| 2006/0145865 A1 | * | 7/2006 | Forster | 340/572.8 |
| 2007/0064541 A1 | * | 3/2007 | Kagan | 368/108 |

FOREIGN PATENT DOCUMENTS

| | | |
|---|---|---|
| DE | 4305349 A1 | 8/1994 |
| DE | 10212823 A1 | 10/2003 |
| EP | 0306494 B1 | 12/1993 |
| EP | 1010585 A2 | 6/2000 |
| JP | 1233427 A | 9/1989 |
| WO | WO 9512877 A1 | 5/1995 |
| WO | WO 2004015674 A1 | 2/2004 |
| WO | WO 2004081644 A1 | 9/2004 |

\* cited by examiner

*Primary Examiner* — Kerri McNally
(74) *Attorney, Agent, or Firm* — Harness, Dickey & Pierce, P.L.C.

(57) ABSTRACT

A switch, particularly a switching device or operating device, includes a flat display, wherein the flat display is provided for the visual display of at least one item of information related to a current or future condition of the switch or a system or machine associated with the switch. A more effective spatial arrangement of the switch components, and reduced energy consumption, is accomplished by a flat display of the switch of at least one embodiment, at least partially including an electrochromic material and electrodes. The electrodes are provided to supply particular regions of the electrochromic material with an electrical voltage, in order to thus activate a color change, and to provide one or more items of information to the use by means of an intelligent control.

23 Claims, 2 Drawing Sheets

SWITCH HAVING A FLAT DISPLAY

PRIORITY STATEMENT

This application is the national phase under 35 U.S.C. §371 of PCT International Application No. PCT/EP2008/061512 which has an International filing date of Sep. 1, 2008, which designates the United States of America, and which claims priority on European patent application number EP07019291.9 filed Oct. 1, 2007, the entire contents of each of which are hereby incorporated herein by reference.

FIELD

At least one embodiment of the invention generally relates to a switch having a flat display, wherein the flat display is provided for visual display of at least one item of information related to a current or future condition of the switch.

BACKGROUND

Switches are used in industrial plant and automation systems but also in the consumer area. They function not only as pure command devices employed to change the status of a machine, a computer or similar, but are also used for interaction between human and machine. They can therefore also be counted as input/output devices in the sense of a Human-Machine Interface (HMI). The feedback to the operator is realized via an optical display which has an information content which is directly related to the machine or to its operating states or switching states. Rotary switches, lever switches, rocker switches, slider switches or push switches/buttons should be mentioned as examples at this point.

The optical display can be based in this case of different methods for visualizing information. Essentially a distinction is made between electrical and mechanical switches. The electrical displays are primarily equipped with light emitting diodes (LEDs) or incandescent lamps. The spatial extent of the electrical lighting elements presents a problem as these elements then occupy valuable space in a switch which is not available to the switching mechanism of the switch. Mechanical displays which can have at least one movable element which appears or disappears in a window represent a further option. Command devices or switches, such as an emergency shutoff switch with a signal display for example, are more susceptible to faults and have a shorter life purely because of their additional mechanics.

Mechanical and electrical displays typically feature symbols and/or text characters for example which are attached to the respective display element or are formed by the latter.

An electrical switch with an illuminated display which is based on a light emitting diode to illuminate its functions is known from DE 43 05 349 A1.

Further, in recent years so called electrochromic displays have been developed in conjunction with other technical challenges. The functioning of an electrochromic display can be illustrated with reference to the exploded diagram shown in FIG. 1.

The main component of the electrochromic display is the electrochromic material 3 which is arranged between lower electrodes 1.1, 1.2, 1.3 and upper electrodes 2.1, 2.2, 2.3. By applying a voltage via an upper and a lower electrode, an area of the electrochromic material 3 can be energized. The consequence of applying an electrical potential is that the optical properties, such as the absorption or reflection behavior for example, are changed. In this case the electrochromic material 3 itself represents an electrochromically reactive layer. The application of an electrical potential appears to the human eye as a change in contrast or in color.

The upper electrodes 2.1, 2.2, 2.3 can in this case be embodied as transparent electrodes which are protected from environmental influences by a protective layer 6.

The electrochromic display from FIG. 1 has a matrix control which allows the electrochromically-reactive layer to be controlled pixel-by-pixel. The lower electrode 1.2 and the upper electrode 2.3 are set by the voltage source 5 to different potentials so that the area 4 (pixels) changes its reflection or absorption properties and delivers to the user a part of the information to be transferred. Such matrix controls are known from LCD or OLED displays for example.

Although the electrochromic display is applied on a carrier layer 7 it is typically 250 micrometers in width.

An electrochromic component, a so-called "smart window", is known from WO 2004/081644 A1, in which the color behavior of an EC material is controlled by the application of a voltage to the electrodes.

SUMMARY

At least one embodiment of the invention specifies a switch with a large variety of optical design options.

In a switch of at least one embodiment, the flat display of which at least in parts features an electrochromic material and electrodes, with the electrodes being provided for application of an electrical voltage to at least one area of the electrochromic material. At least one embodiment is likewise achieved by a switching device, especially a command device, and by an overload relay which feature at least a switch of this type.

Inventively the switch has a flat display which is provided for visual display of an item of information. The information in this case can be a current or future state of a machine, of a technical installation or similar. The transferred information in this case represents to some extent feedback to the user containing an instruction or a recommendation in relation to operation. This recommendation or instruction is directly related to the functions of the switch or command device to be triggered or controlled. Thus for example an optical display can communicate the information to the user that an actuation will currently produce a desired result or may possibly represent a degree of risk. In precisely the same way the information can be understood as an indication of how the command device or the switch is to be operated or of the status which can be achieved by the actuation. Basically this communication between machine and user corresponds to a so-called HMI application.

For communication with the user the switch has a flat display which at least in part features an electrochromic material. This electrochromic material is or contains an electrochromically-reactive layer which changes its optical properties through the application of an electrical potential by means of electrodes. The incident light is either reflected or absorbed differently for different potentials. This appears to the human eye as a change in color.

Since the electrodes are provided for applying an electrical voltage to at least one area of the electrochromic material, this change in color also appears exactly in the energized area. To increase the information content a number of these areas can be provided, which however must be supported by the corresponding electrode arrangement. Thus for example a matrix arrangement is conceivable in which lower and upper electrodes are arranged on the electrochromic material and because of their orientation jointly form a grid structure. The individual controllable areas are defined in their dimensions by the width of the electrodes and can if necessary be reduced to the desired pixel width.

Advantageously the flat display can be embodied in a low profile, whereby additional space is made for mechanical parts which can be assigned to the switching mechanism. This also makes it possible to fit the flat display into places which for other reasons do not allow more voluminous display means to be installed. It is also advantageous for the flat display to be definitively oriented to the functional shapes of the switch or command device and for no display surface to have to be provided explicitly for the display. For example this makes a combination of functions of the surface used for display possible in that this can be used for information transmission and for example for actuation.

In an advantageous development the switch has a protective layer, especially a protective film, to protect the electrodes. And undesired fall in potential in one of the upper or lower electrodes can lead to an incorrect display and is effectively prevented by a protective layer or protective film. In this context a transparent protective layer also proves to be advantageous since the color change or its contrast is not optically adversely affected.

Advantageously at least one electrode is embodied as a transparent electrode. This likewise further improves the view of the electrochromic material, especially when there is a requirement to fix the electrodes to both sides of the electrochromic material.

Advantageously transparent electrodes make possible a combination of the flat display with conventional illumination elements, such as LEDs, incandescent bulbs or the like for example. With suitable material only a small part of the light is lost in backlighting. Thus a further communication option with the user is opened up in which the display elements cannot only be displayed but also illuminated. This development is thus also able to be used in a dark or darkened environment.

In an advantageous development the flat display entirely or partly forms the actuation surface of the switch or is integrated into another component of the switch which has its own function. It is thus conceivable for example for the flat display to be integrated entirely or in part into a component which is provided for attachment, for identification or blocking of the switch. This reduces the size of the switch and reduces the number of components.

In an advantageous development the lever or the grip typically features a flat display. It is thus possible to allow the actuating element a larger space and thus make it accessible for easier operation since a separate display surface is not necessary.

In an advantageous embodiment of the information contains at least one symbol, a number, a letter, a special character, a flowchart or a combination of these. Pictograms or similar symbols should also be thought of in this context for example, this is especially achieved by a particular electrode arrangement or electrode form.

Advantageously the information has a time dependency. Thus scrolling texts, flashing components or screen-type displays are also possible without expending the same effort for operation as is involved for example with a liquid-crystal display (LCD) or a screen.

Advantageously the information contained is a physical variable, especially current, voltage, temperature and/or a signal, especially a trigger signal. For example a machine could change over to another state on reaching a temperature threshold value which is able to be presented on the flat display or to be announced in advance. As an alternative or in addition the state of an installation could also be influenced or modified by a signal, especially by a trigger signal if the installation for example indicates a failure or the impending need to refill with a raw material.

Advantageously the electrochromic material is suitable for generating one or more colors. Its electrochromically-reactive layer can consist in this case of a mixture of different chemicals. The color change typically occurs by a substance changing to one color in one current direction and to another in the reverse current direction. Changing to a color in accordance with this method also includes possibly becoming colorless, with the removal of color from the reactive component disclosing the view of another material, e.g. an opaque, inert intermediate material. Different colored monochrome and color displays are to be distinguished here, as are known from so-called "E-paper" and "E-label".

Advantageously the switch features two or more electrochromic materials with electrodes. This makes it possible to provide a plurality of colors, with an electrochromic material able to be assigned to a color.

Further advantageous developments are able to be realized as a switching device, especially a command device, a signaling device, positioned switch, contactor, power switch or compact branch with at least one inventive switch. Basically the inventive switch of at least one embodiment is also able to be configured as an electromechanical switching device of which the function can be linked to the status of an installation, machine or a similar technical device. Consequently this also includes an illuminated pushbutton which belongs to the class of command devices, has a switching function and indicates the status of another machine. In particular the embodiments of the invention are not restricted to the example embodiments of the following figure description.

Further advantageous embodiments and preferred developments of the invention can be found in the description of the figures and/or in the subclaims.

BRIEF DESCRIPTION OF THE DRAWINGS

The invention will be described and explained in greater detail below on the basis of the example embodiments shown in the figures.

The figures show.

DETAILED DESCRIPTION OF THE EXAMPLE EMBODIMENTS

Figure 1:
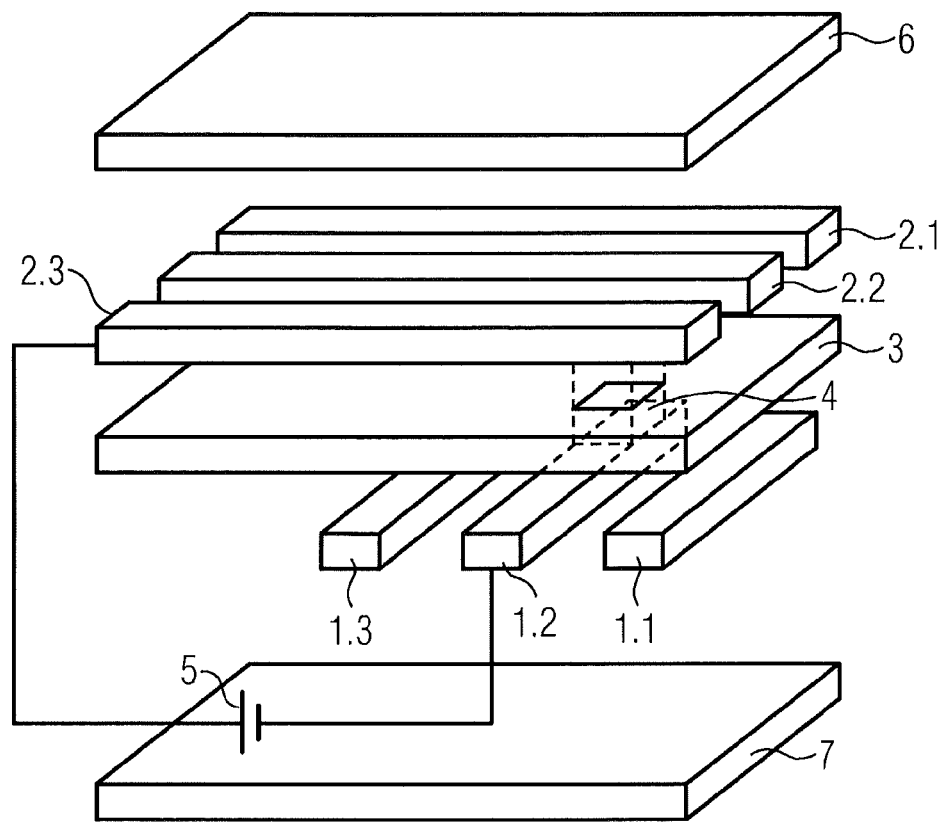
FIG. 1 an electrochromic display with matrix control according to the prior art, FIGS. 2 and 3 a pushbutton switch with activated or deactivated flat display.

FIG. 1 shows and electrochromic display with matrix control in accordance with the prior art in which lower electrodes 1.1, 1.2, 1.3 and upper electrodes 2.1, 2.2, 2.3 are arranged in the form of the grid and layered onto an electrochromic material 3. In this way areas 4 which are embodied as pixels can be individually controlled by a difference in potential of the respective participating electrodes.

Figure 2:
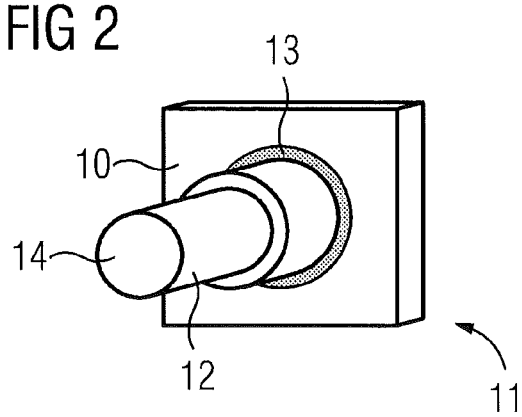
Figure 3:
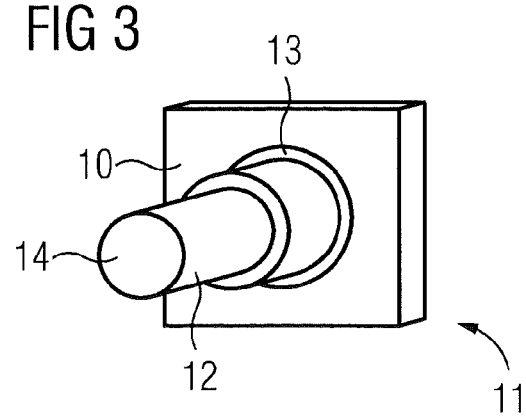

The lower electrodes 1.1, 1.2, 1.3 lie on the carrier layer 7. A voltage source 5 brings the upper and lower electrodes to the necessary electrical potentials. FIGS. 2 and 3 show a pushbutton switch 11 with activated or deactivated flat display 13 respectively. The pushbutton switch 11 has a grip 12 with a surface 14 which is encircled by the flat display 13 and the surface 10. In the non-activated state the flat display 13 is presented to the observer in the same color as the surface 10. This is achieved for example by the electrodes of the flat display being embodied largely transparently just like the protective surface and the electrochromic material used in the deactivated state.

If the electrochromic material is activated by an application of a voltage, this becomes opaque and absorbs a part of the light spectrum giving the impression of a color. Thus for example a purple color of the flat display 13 could indicate a critical state of a machine and impart information to the user that pressing the button 12 could possibly lead to greater damage. Optionally the surface 14 could be used for this purpose.

Likewise conceivable is a change in color from a less striking color such as white, yellow or green for example, to a signal color such as orange, red or purple.

It is advantageous for both the electrodes and also the electrochromic material of the flat display 13 to be easily able to be adapted to the circumstances, i.e. to the necessary ring shape. Now for example the surface 10 can be reduced in its extent since a flat display directly around the grip 12 is fully sufficient for information transmission. The switch 11 is able as a result to be reduced in its dimensions, with due consideration given to operating safety.

This is especially possible since a higher contrast of the flat display makes up for an extension of the flat surface of the latter. With this technique color contrasts in a ratio of 1:25 are possible.

It is likewise advantageous that the transmission of information to the user can also not be put at risk by the angle of view, which with this technique with up to 165° always allows good visibility. By comparison with this, with today's flat screen technology based on thin film transistors (TFT), only an angle of view of around 135° with some restrictions is possible.

Advantageously this represents a very economical solution to the display problem since only a very low energy requirement is necessary, which typically lies below $<500 \times 10^{-6}$ W/cm². The voltage requirement is also low and typically lies at 1.2 V to 1.3 V. The development is economical not only because of the low power consumption but also as a result of the significantly more favorable manufacturing costs compared to conventional LCD or LED displays.

Figure 4:
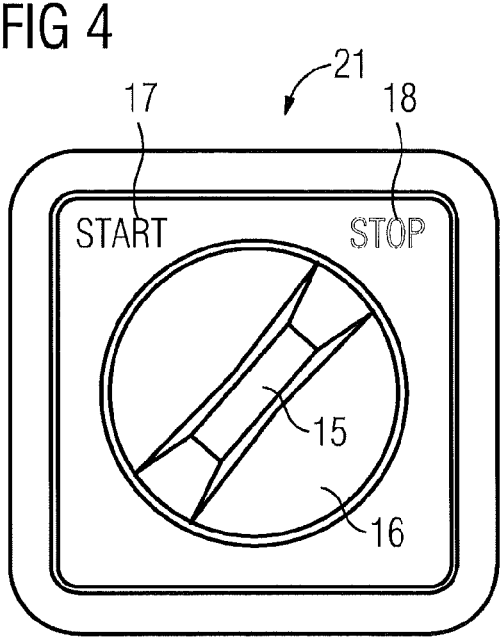
FIGS. 4 and 5 a rotary switch with activated or deactivated flat display.
Figure 5:
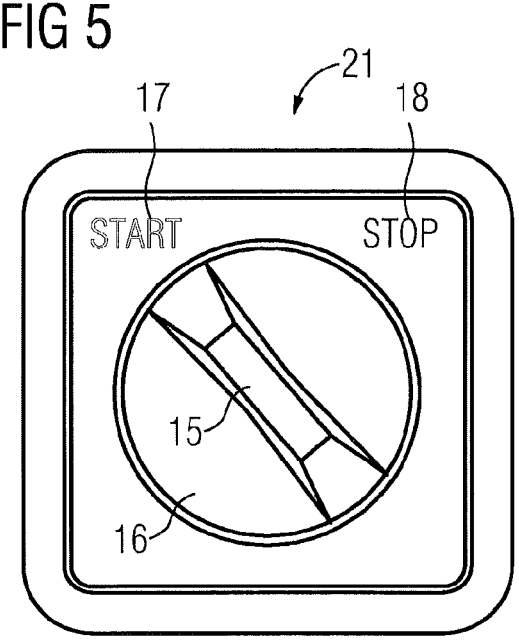

FIGS. 4 and 5 show a rotary switch 21 with deactivated or activated flat display 16. The flat display 16 extends over a part of the actuator which also includes the grip 15. This achieves a combination of functions which reduces the number of components and shows the association between the transferred signal and the actuator or the grip 15.

The rotary switch 21 can for example be used for starting up a technical installation, with information relating to the state of the installation being communicated simultaneously to the user.

The rotary switch 21 has flat displays 17 and 18 which form the labels "stop" and "start" respectively. Both displays show the respective label written normally or in inverted colors. Since the inversion is more eye-catching than the non-inverted label, the user recognizes from this whether the technical installation is currently powered up or not. The electrodes used within the flat display 17, 18 form the letters presented or their inverted presentation in this case, with the electrodes forming the inverted presentation being controlled electrically separately from the electrodes forming the letters. Only one electrode may possibly be necessary in each case.

Since the actual powering of the technical installation very often does not coincide with actually putting it into operation, the flat display 16 can be provided for indexing the actual putting into operation of the installation. This means that the color change of the flat display 16 only occurs when the technical installation starts up. This means that it is possible for the user to switch the power supply off again without danger if the technical installation cannot be put into operation.

It proves advantageous in such cases to combine the grip 15 with the flat display 16 whereby, because of the spatial extent of the grip 15, a good visibility of the flat display in the room is guaranteed. This is further supported by the fact that the flat display 16 occupies a large proportion of the rotary switch 21. Compared to mechanical switch position displays, because of the high contrast, visibility can even be maintained even when visibility conditions worsen. The large-area color change produces a very good signal effect which can be supported by slow or fast flashing which is caused by an alternating voltage. The flashing is based in such cases not on a light effect but merely in the change of color and/or contrast.

Advantageously a light element can be combined with the switch and especially with the flat display. If a light element, such as an LED or a TFT display for example, is fitted under the flat display, the monochrome material likewise has an influence on the light behavior of the flat display. Structures, symbols, letters etc which are formed by the flat display can be backlit. In this case it is necessary to embody the upper and lower electrodes transparently so that light from the illumination element can get out. The attenuation of the light is possible in such cases by a controlled absorption.

Figure 6:
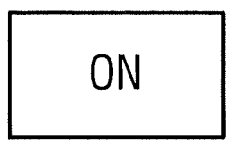
FIGS. 6 and 7 a flat display with pixel representation of an on and an off state.
Figure 7:
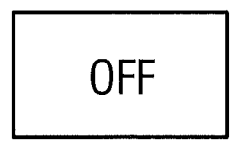

FIGS. 6 and 7 show a flat display with the pixel representation for representing an on state and an off state.

Advantageously the flat display of the switch can be operated entirely like a so-called dot matrix display. In a similar manner to known LCDs, a large variation of symbols or text that changes in any manner required can be generated with these flat displays by means of electronic control. Particular examples of this are flashing symbols and scrolling text.

Because of the pixel-type activation of the electrochromic material this can be referred to as a screen-like display. This makes it possible to be able to display different symbols, letters or the like at the same point, as is shown for the words "on" and "off".

Figure 8:
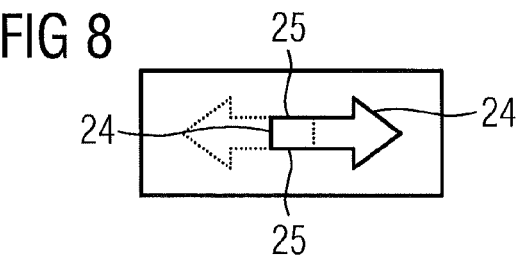
FIGS. 8 and 9 a flat display for symbolic presentation of two direction states.
Figure 9:
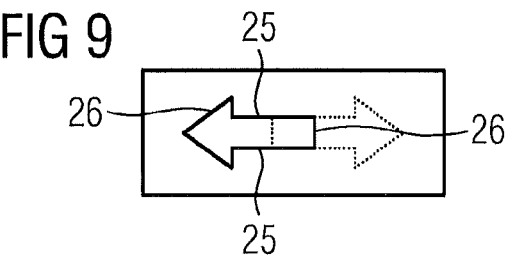

FIGS. 8 and 9 show a flat display for symbolic presentation of two directional states.

This type of flat display, as is the case in the other example embodiments, is suitable for use in combination with command and signaling devices. Not only can a label or the color of the flat display be changed but a symbolic representation can also prove to be advantageous.

The symbols of FIGS. 8 and 9 consist of an arrow pointing to the left and one pointing to the right. The right-pointing arrow consists of independent display elements 25 and status-dependent display elements 24. Electrodes are only needed for the display elements 24 which with their actual shape complete the shape of the arrow elements. The situation is similar with the status-dependent elements 26 of FIG. 9. It is advantageous that for a status transition the elements 25 do not have to be activated or do not have to contain any electrodes at all in order to represent independent display elements in the flat display. The part integration of the two symbols into each other produces is further potential for savings in respect of the energy consumed and the manufacturing process.

Figure 10:
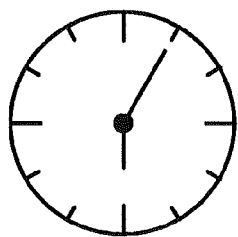
FIG. 10 a flat display for time indexing.

FIG. 10 shows a flat display for time indexing. The flat display is further suitable for showing operating parameters such as operating currents, switch positions, warnings, faults detected, components nearing the end of their life etc.

The flat display shown is reminiscent of a clock. For example the user could be informed about how long after it has been switched on the machine or technical installation still remains in the safe state. Furthermore such a flat display could be used in combination with an on-off switch, with the actual operating time merely being shown in the form of minutes or hours by the clock only running during actual operation. A brief press (for example on the flat display itself) activates or deactivates the machine or installation to be controlled.

In summary, an embodiment of the invention relates to the switch, especially a switching device or command device, wherein the flat display is provided for visual display of at least one item of information related to a current or future condition of the switch or of an installation machine has signed to the switch. A spatially more effective arrangement of the switch components as well as a reduced energy consumption are to be brought about by a flat display of the switch which at least in parts features an electrochromic material and electrodes. The electrodes are provided for applying an electrical voltage to specific areas of the electrochromic material in order to provoke a color change or to pass on one or more items of information to the user by way of an intelligent activation.

The invention claimed is:

1. A switch, comprising: a flat display for visual display of at least one item of information related to a current or future condition, the flat display at least in part including an electrochromic material and electrodes, the electrodes being configured to apply an electrical voltage to at least one area of the electrochromic material, wherein at least part of a viewable portion of the electrochromic material surrounds an entirety of an actuator of the switch, wherein at least some of the electrodes are transparent, and wherein a light element is arranged under the transparent electrodes.

2. The switch as claimed in claim 1, wherein the flat display includes a protective layer.

3. The switch as claimed in claim 1, wherein the flat display includes at least one transparent electrode.

4. The switch as claimed in claim 1, wherein the flat display includes a plurality of electrodes and areas of the electrochromic material, the areas of the electrochromic material being configured like pixels.

5. The switch as claimed in claim 1, wherein the flat display is provided entirely or in part to activate the switch.

6. The switch as claimed in claim 1, wherein the switch includes a grip for changing the switching status of the switch, and the flat display is formed onto the switch.

7. The switch as claimed in claim 1, wherein the at least one item of information contains at least one of a symbol, a number, a letter, a special character and a flowchart.

8. The switch as claimed in claim 1, wherein the at least one item of information includes a time dependency.

9. The switch as claimed in claim 1, wherein the electrochromic material is configured to generate one or more colors.

10. The switch as claimed in claim 1, wherein the switch includes two or more electrochromic materials with electrodes, and the electrodes are configured to apply an electrical voltage to at least one area of the electrochromic materials.

11. The switch as claimed in claim 1, wherein the at least one of the future and current state is the switching state of the switch or a state of a machine or installation associated with the switch.

12. The switch as claimed in claim 1, wherein the at least one item of information contains a physical variable.

13. The switch as claimed in claim 2, wherein the protective layer includes a protective film configured to protect the electrodes.

14. The switch as claimed in claim 2, wherein the switch includes a grip for changing the switching status of the switch, and the flat display is formed onto the switch.

15. The switch as claimed in claim 8, wherein the at least one item of information includes a time dependency as scrolling text, flashing information or a screen-type display.

16. The switch as claimed in claim 12, wherein the physical variable includes at least one of current, voltage, temperature and a signal.

17. The switch as claimed in claim 1, wherein at least electrodes provided underneath the electrochromic material are transparent.

18. The switch as claimed in claim 17, wherein a light element is arranged under the transparent electrodes.

19. A switching device, comprising:
at least one switch as claimed in claim 1.

20. The switching device of claim 19, wherein the switching device is a command device, signalling device, positions switch, contact, power switch or compact branch.

21. An overload relay with at least one switch as claimed in claim 1.

22. A switch, comprising:
a flat display for visual display of at least one item of information related to a current or future condition, the flat display at least in part including an electrochromic material and electrodes, the electrodes being configured to apply an electrical voltage to at least one area of the electrochromic material, wherein
at least some of the electrodes are transparent, and
a light element is arranged under the transparent electrodes.

23. A switch, comprising:
a flat display for visual display of at least one item of information related to a current or future condition, the flat display at least in part including an electrochromic material and electrodes, the electrodes being configured to apply an electrical voltage to at least one area of the electrochromic material, wherein
at least electrodes provided underneath the electrochromic material are transparent, and
a light element is arranged under the transparent electrodes.

* * * * *